United States Patent [19]

Stoka

[11] Patent Number: 4,817,764
[45] Date of Patent: Apr. 4, 1989

[54] SPOT-TYPE DISC BRAKE

[75] Inventor: Roberto Stoka, Nauheim, Fed. Rep. of Germany

[73] Assignee: ITT Industries, Inc., New York, N.Y.

[21] Appl. No.: 514,065

[22] Filed: Jul. 15, 1983

[30] Foreign Application Priority Data

Sep. 3, 1982 [DE] Fed. Rep. of Germany ....... 3232759

[51] Int. Cl.$^4$ .............................................. F16D 65/14
[52] U.S. Cl. .............................. 188/73.44; 188/73.45; 188/250 R
[58] Field of Search ............... 188/18 A, 73.31, 73.32, 188/73.33, 73.34, 73.39, 73.43, 73.44, 73.45, 205 R, 206 R, 206 A, 250 F, 250 G

[56] References Cited

U.S. PATENT DOCUMENTS

| 3,261,430 | 7/1966 | Wilson et al. | 188/73.32 |
| 4,232,764 | 11/1980 | Yamamoto | 188/73.32 |
| 4,350,229 | 9/1982 | Ito et al. | 188/73.32 X |
| 4,392,559 | 7/1983 | Oshima | 188/73.45 X |

FOREIGN PATENT DOCUMENTS

| 1161091 | 1/1964 | Fed. Rep. of Germany | 188/18 A |
| 2334553 | 1/1974 | Fed. Rep. of Germany | 188/73.44 |
| 2839195 | 3/1979 | Fed. Rep. of Germany | |
| 3044185 | 6/1981 | Fed. Rep. of Germany | |
| 2422863 | 11/1979 | France | 188/73.44 |

Primary Examiner—Andres Kashnikow
Assistant Examiner—Timothy Newholm
Attorney, Agent, or Firm—James B. Raden

[57] ABSTRACT

A spot-type disc brake with a floating-caliper comprises a brake support member and a brake caliper that is arranged at the wheel axle in a manner slidable parallel to the brake disc axis by a single guide element (5,6) includes brake shoes which are replaceable tangentially relative to the brake disc. The brake support member is constructed in the shape of a retaining element which is arranged on one side of the brake disc parallel to the disc and which may be constructed integrally with the wheel axle. The brake shoes are retained either on the disc entry side in the brake caliper (2) or on the disc exit side at the brake support member (1) or in the brake caliper by retaining elements. On the side opposite to the retaining elements, i.e. on the disc entry side or on the disc exit side, the brake shoes are supported in the brake caliper.

3 Claims, 3 Drawing Sheets

SPOT-TYPE DISC BRAKE

BACKGROUND OF THE INVENTION

The present invention relates to a spot-type disc brake, in particular for automotive vehicles, which substantially comprises a brake support member fastened to the wheel axle and a brake caliper embracing the edge of a brake disc having a brake-actuating device and brake shoes to be pressed against the brake disc from either side when the brake is activated, the caliper being arranged on a guide element in a manner slidable parallel to the brake disc axis and the brake shoes being held by means of pins, screw bolts or the like.

Known floating-caliper disc brakes of this type include an opening provided in that portion of the brake caliper which is arranged above the circumference of the brake disc, the opening being sized at least to allow removal through it of worn brake shoes after detaching retaining pins and to enable insertion of new brake shoes, both the worn and new brake shoes comprising a pad carrier and a brake pad. In some cases it is not necessary to dismount the disc brake from the wheel for the replacement of the brake shoes. The frictional and braking forces are transmitted partly to the retaining elements, i.e. pins or screw bolts, in conjunction with expanding springs, partly, through marginal areas of the pads or pad carriers which abut against corresponding areas of the brake caliper, to the latter and from the caliper via the brake support member to the wheel axle. In this context, it is difficult to exclude an overload of the individual components due to the high braking forces at any condition of wear and to keep the forces low which are necessary to enable the caliper to slide.

It is also known to support the floating brake caliper in a slidable manner on two bolts arranged parallel to the disc brake axis at a radial distance from each other. The two bolts are fixed either directly to the wheel trunnion or to an element of the vehicle frame. In a known embodiment of this kind as disclosed in German Patent DE-A1 3,044,185 the brake caliper carriers only the external brake pad and is guided only by one of the two bolts. The internal brake pad arranged opposite is mounted on a supporting plate which slides on the second guide bolt during braking. When the brake is actuated, the hydraulic brake cylinder arranged at the internal leg of the brake caliper acts on the supporting plate. In addition, the internal supporting plate is connected with a guiding and force transmitting element which engages the brake caliper on the disc entry side as well as on the disc exit side, the connection being realized in such a manner that while a slide parallel to the brake disc axis is rendered possible, the circumferential force exerted on the supporting plate is, however, transmitted also to the brake caliper and through it in part to the second guide bolt. The circumferential or frictional forces are, thus, distributed to both guide bolts in a virtually uniform manner.

The use of two guide bolts entails a significant volume of manufacturing and assembly efforts. Moreover, it is difficult to align the guide bolts such that the braking forces are uniformly transmitted to the guide bolts permanently and at any wear condition of the pads which is necessary to prevent the bolts from canting or clamping in the slide bearing or an inadmissible increase of the necessary caliper sliding force.

A spot-type disc brake preferably intended for motorcycles which floats only on one guide bolt and is constructed as a pendulum-type caliper brake is also disclosed in German Patent DE-OS 28 39 195. The whole brake abuts against a supporting element arranged aside the brake disc, with the guide bolt which holds the brake on the supporting element being arranged roughly in the center of the supporting area. The brake shoes are retained in the brake caliper with the aid of an extended portion of the guide bolt and of a second, shorter bolt which exclusively extends through the brake caliper. The total circumferential or frictional forces must be absorbed by these two bolts. In this version, a uniform transmission of forces from the brake shoes to the retaining bolts, from the latter to the brake caliper and to the guide element as well as to the supporting areas is attainable, if at all, only in case of relatively low braking forces.

SUMMARY OF THE INVENTION

It is an object of the present invention to provide a spot-type disc brake which offers comparative ease of manufacture, mounting and maintenance. The required caliper sliding forces will be low even after prolonged use and in any condition or degree of wear of the brake pads to provide high reliability and an extended service life.

A feature of the present invention is the provision of:
A spot-type disc brake comprising:
a brake support member fastened to a wheel axle, the support member being shaped like a retaining element disposed on one side of and parallel to a brake disc;
a brake caliper embracing the edge of the brake disc and being disposed on and slidable relative to a single guide element fastened to the support member parallel to rotational axis of the brake disc; the caliper being supported by the support member adjacent a disc exit side therof with respect to a main direction of rotation of the disc; and
a pair of brake shoes each disposed on a different side of the brake disc and in the caliper, the pair of brake shoes being retained in the caliper by retaining elements which when removed enable the pair of brake shoes to be replaced tangentially with respect to the brake disc.

In the case of the brake disc according to the present invention, the frictional or braking forces are transmitted, in the main sense of rotation of the brake disc, i.e. during braking in forward driving, via a brake carrier of very simple construction from the brake caliper to the axle. Thanks to the support given to the brake caliper, the guide element on which the brake caliper floats is relieved of the major braking forces so that the caliper sliding forces are minimized and the guide is prevented from canting and clamping even after prolonged service. Owing to the tangential insertion and removal of the brake shoes, it is possible to replace the pads without dismounting the disc brake and the brake caliper. Since the retaining pin needs to be detached for this purpose only on one side of the brake pad, the time spent on these operations is short.

In an advantageous embodiment of the present invention the pad carriers of the brake shoes are furnished on both narrow sides, i.e. in the range of the disc entrance of the disc exit, with attachments that serve to retain the pads in the brake caliper. Both brake shoes are suspended slidably in the brake caliper at the disc exit or at the disc entry on a guide area positioned parallel to the brake disc axis and are retained slidably parallel to the brake disc axis on the opposite side near the disc entry or the disc exit by means of pins or bolts fitted in the brake caliper. It is of advantage in some cases to fit the pins or bolts in the vicinity of the disc entrance and to support the pad carriers in the range of these fixation elements at the brake caliper carriers against the frictional or braking forces arising in the main sense of rotation.

In another version of the present invention both pad carriers are suspended in the caliper at the disc entrance and retained by at least one pin or bolt fixed to the brake support member arranged parallel to the brake disc axis. On the other hand, it is possible alternatively to suspend the brake shoe which is arranged on the side of the brake support member in the brake caliper at the disc entrance as referred to the main sense of rotation of the brake disc and to retain it in the brake support member on the opposite side, i.e. at the disc exit, by means of a pin or bolt and to suspend the second shoe in the brake caliper at the disc exit and retain it in the brake caliper by a pin or bolt at the disc entrance. In this latter case, both brake shoes may have identical shape and dimensions.

Being constructed in the shape of an extended narrow retaining element arranged only on one side of the brake disc, the brake support member may easily be constructed as a part of the wheel axle or of the wheel housing. This, too, has a favorable bearing on the bulk of manufacturing and mounting operations.

The guide element by which the brake caliper is retained slidable parallel to the axis—one single guide bolt is sufficient for the brake according to the present invention—is advantageously located near the disc entrance as referred to the main sense of rotation of the brake disc.

It is furthermore envisaged to provided an opening in the portion of the brake caliper which bridges the brake disc in order to be able to check the thickness of the brake pads at any moment, without dismounting operations.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
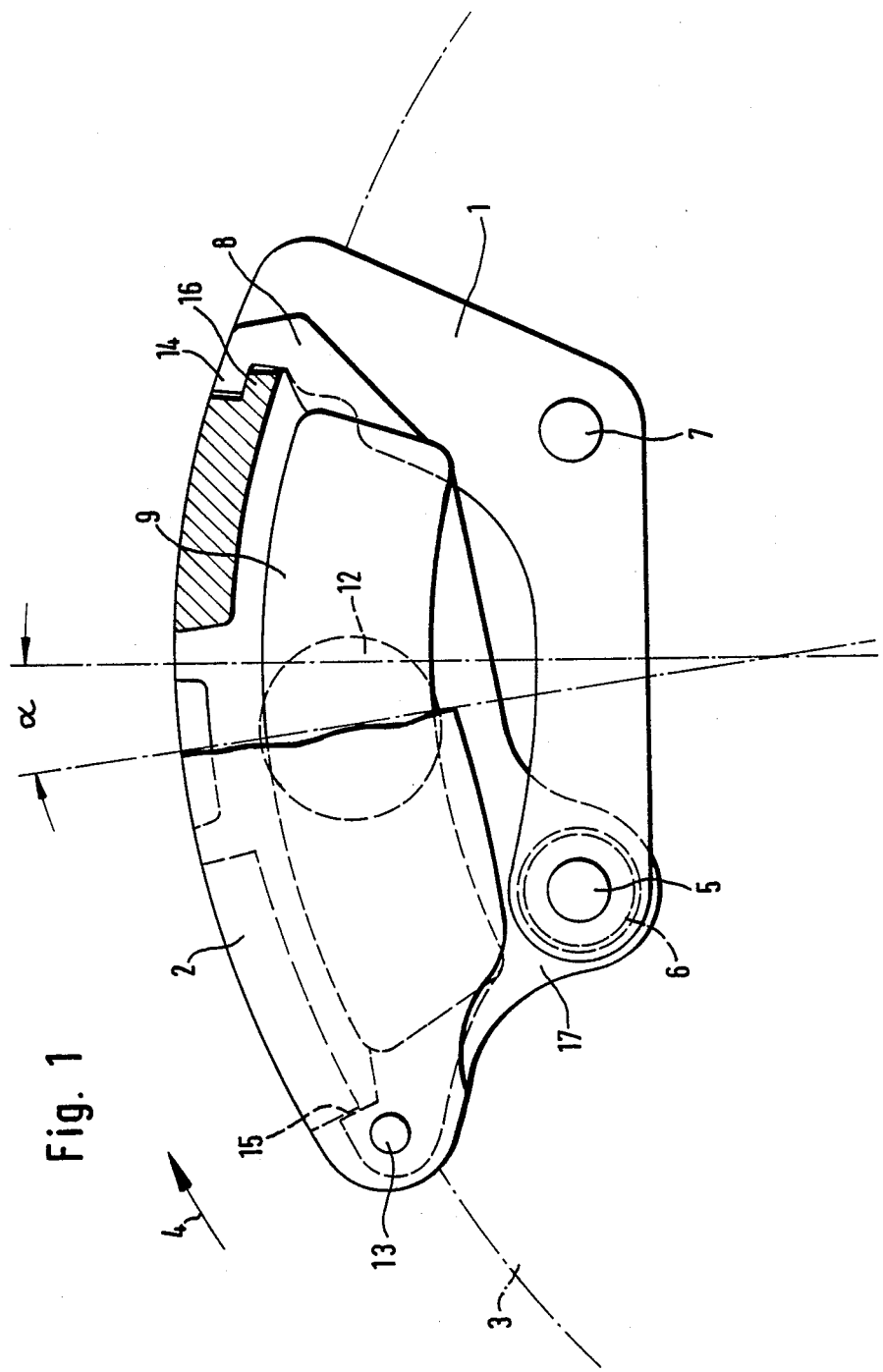
FIG. 1 is a lateral view and a cross sectional view along the line A-B in FIG. 2 of a just embodiment of a disc brake of the present invention

As illustrated in FIG'S. 1 and 2, the disc brake according to the present invention is essentially comprised of the brake support member 1 and of the brake caliper 2. The main direction of rotation of the brake disc, which is only outlined, is symbolized by the arrow 4. This direction corresponds to forward driving.

All elements of the disc brake which are essential functionally are contained in the brake caliper 2 which is fitted to the wheel axle, to the wheel trunnion or to the wheel housing slidable parallel to the axis of the brake disc 3 by means of one single screw bolt 5 which bears a guide bushing 6. In the illustrated embodiment, the screw bolt 5 together with the shorter screw bolt 7 serves in addition to fasten the brake support member 1 to relevant elements of the wheel axle. Fastening eyes 23, 24 are outlined in FIG. 2 which are part of the wheel axle and serve to fasten the brake support member 1 to the axle. As an alternative, the brake support member could be manufactured integrally with, i.e. as a component part of the wheel axle or of the wheel housing. The direction of movement of the caliper 2 on the guide bushing 6 is vertical to the drawing plane of FIG. 1. This becomes still clearer when viewing FIG. 2.

Figure 2:
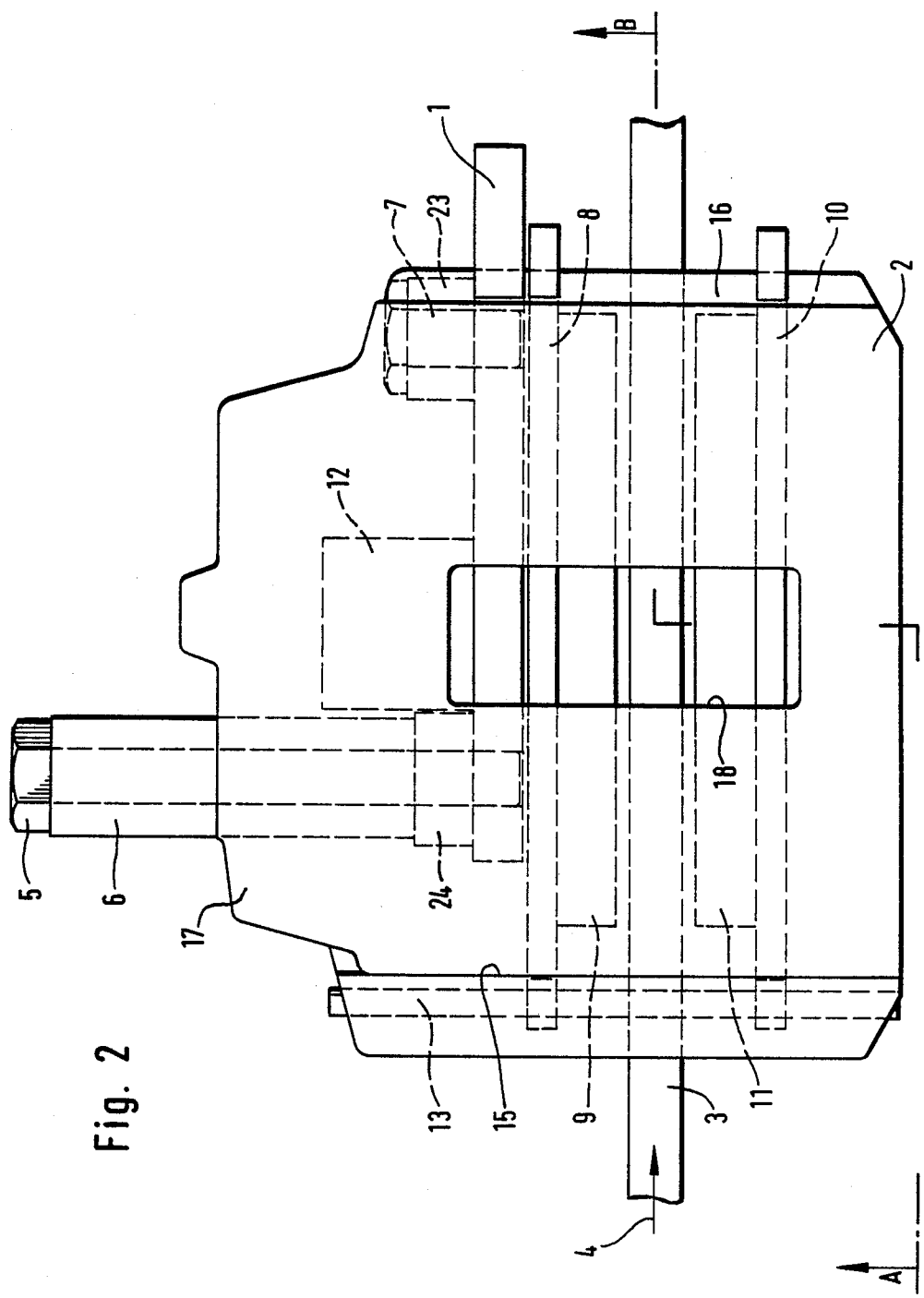
FIG. 2 is a top view of the disc brake of FIG. 1.

As is clearly visible in FIG. 2 the brake shoes, each of which is composed of a pad carrier 8, 10 and of a brake or friction pad 9, 11, are retained in the brake caliper 2. When the brake is actuated the brake shoes are pressed against the brake disc 3 from both sides in a known manner with the aid of a wheel cylinder 12 outlined in FIG'S. 1 and 2. Cylinder 12 directly activates the brake shoe including pad carrier 8 and pad 9 and the working pressure of cylinder 12 is transmitted by the floating brake caliper to the opposite brake shoe including pad carrier 10 and pad 11.

In this case, the brake shoes 8, 9 and 10, 11 are suspended in the brake caliper 2 in the vicinity of the disc exit i.e. the righthand side in FIGS. 1 and 2, and supported at the brake caliper 2 and fastened in the caliper by a retaining pin 13 at the brake disc entrance, referred to the main direction of rotation of brake disc 3. The suspension 14 at the disc exit as well as the support at the area 15 in the brake caliper 2 and the fastening by the retaining pin 13 must be constructed such that at least the internal brake shoe 8, 9, and preferably both brake shoes, are slidable parallel to the axis of the brake disc 3 and in consequence parallel to the guide element 5,6 when the brake is actuated. However, the external brake shoe 10, 11 normally abuts against one leg of the brake caliper 2 and, as an alternative, could therefore be connected solidly to the brake caliper at this point, but this solution generally entails unnecessary construction efforts. In the shown version of the present invention both brake shoes are slidable in parallel on the guide edge 16 of the brake caliper, on the pin 13, and at the supporting area 15.

On the disc entrance side, i.e. the lefthand side in FIGS. 1 and 2, the brake caliper 2 is furnished with an arm 17 having a bore by which it is retained on the bushing 6 slidably parallel to the axis of the disc 3. Any sleeves or similar devices preventing the penetration of dirt into the guide element in a known manner are left off of FIGS. 1 and 2 for reasons of clarity.

The brake shoes, or the pad carriers, as is normal are secured against rattling and unintentional loosening or parallel shifting by means of expanding springs. Since these measures are known, the springs are not shown in FIGS. 1 and 2 for the sake of clarity of the diagrammatic illustrations.

The opening 18, see FIG. 2, located in that portion of brake caliper 2 which embraces brake disc 3 serves primarily for an easy check of the pad thickness and, thus, of the wear condition.

For an exchange of the brake shoes, it suffices to remove retaining pin 13, which unhooks the brake shoes and enables the brake shoes to be taken off tangentially relative to the break disc 3 and replaced. The (not shown) expanding springs are normally placed on the brake shoes before insertion of the pin 13.

Figure 3:
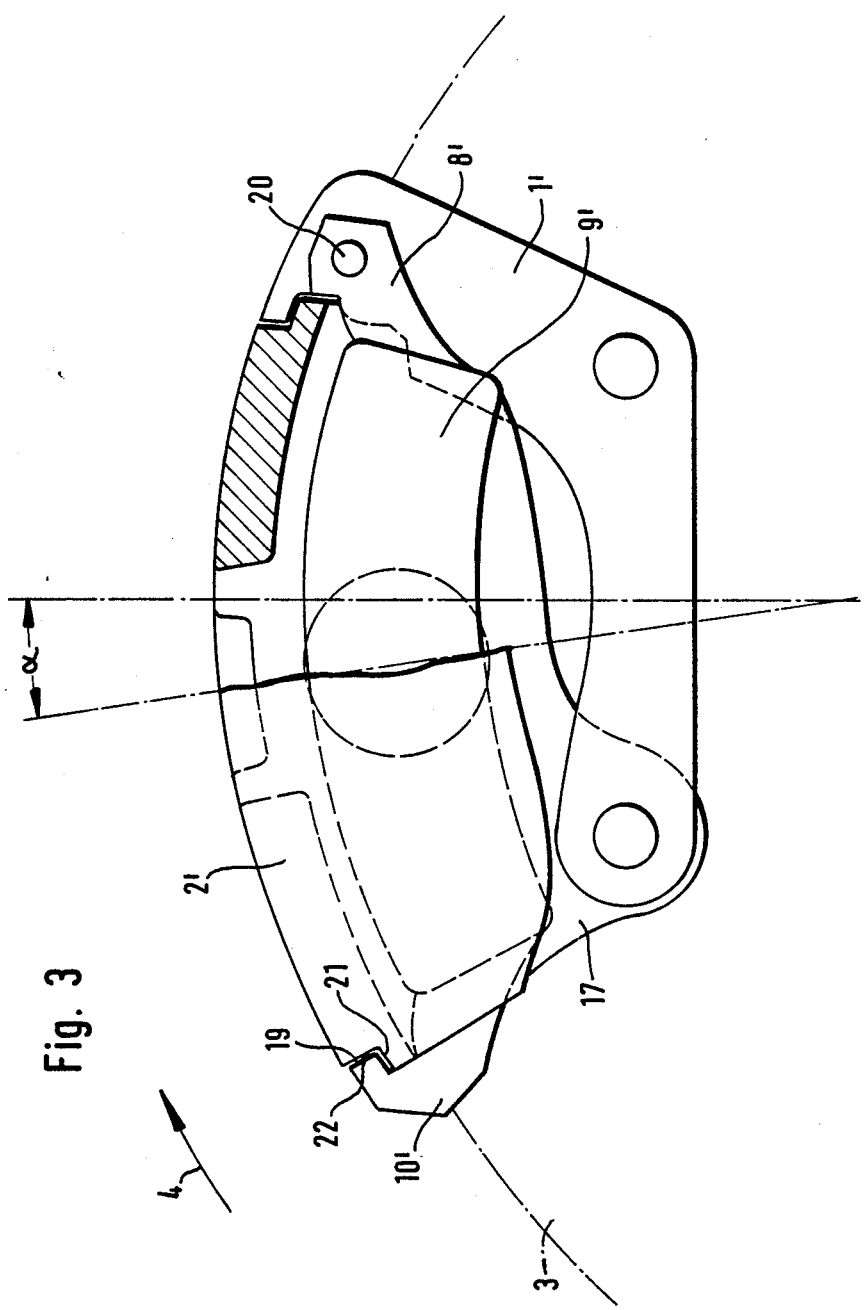
FIG. 3 is an illustration as in FIG. 1 of another embodiment of a disc brake in accordance with the principle of the present invention.

In the embodiment of the present invention shown in FIG. 3, the brake shoes are suspended in the brake caliper 2' at the entrance of the brake disc 3, caliper 2' being furnished with a corresponding right-angled recess 19 for the purpose, which in its turn forms areas 21 and 22 arranged parallel to the axis of the brake disc 3 and serving as a guide and support for the brake shoes or the pad carriers 8', 10'. In this case, a retaining pin or screw bolt 20 is fitted into the pad carrier 8' and support member 1' on the opposite side, i.e. at the disc exit. Since in the main direction of rotation 4 of the brake disc 3 only a small portion of the frictional and braking forces is transmitted to the retaining pin 20 due to the brake shoe being supported at the area 22, it is possible to fasten both brake shoes to this pin and thereby to the brake support member 1' although, as is revealed by FIG. 3, the brake support member 1' is located on one side only of the brake disc 3. On the other hand, it is possible, as an alternative, to secure by a pin 20 fitted in the support member 1' solely that brake shoe 8', 9' which is arranged on the side of the brake support member 1' while the pad carrier on the opposite side of the brake disc 3 is suspended and fastened similar to what is shown in FIG. 1. In this way it would be possible to mount brake shoes identical in shape and dimensions on both sides of the brake disc 3.

In the end, it is also possible on principle, in an embodiment similar to FIG. 3, to fit the retaining pin not into the brake support member but into the brake caliper near the disc exit. This would bear the advantage again, just as in the version according to FIG. 1, that all essential parts of the brake are combined in the brake caliper and could, therefore, be prefabricated or be mounted as a complete assembly.

The rotation by the angle of the brake caliper center with respect to the brake support member as selected in the embodiment described here permits a particularly compact construction of the whole disc brake.

While I have described above the principles of my invention in connection with specific apparatus, it is to be clearly understood that this description is made only by way of example and not as a limitation to the scope of my invention as set forth in the objects thereof and in the accompanying claims.

I claim:

1. A spot-type disc brake comprising a brake support member disposed on one side of and parallel to a brake disc,
   a brake caliper embracing the edge of said brake disc, said caliper having an arm having a first opening through which a bushing passes to slidably mount said caliper to said support, said caliper having a second opening on a disc entrance side thereof with respect to a main direction of rotation of said disc, a pin received in the second opening in the caliper and extending parallel to a rotational axis of said brake disc,
   a pair of brake shoes each disposed on a different side of said brake disc and each including a pad carrier and a friction pad fastened to the carrier, each of said pad carriers having an opening at said disc entrance side thereof through which said pin passes, each of said pad carriers also having a suspension tab extending from a disc exit side thereof, said caliper having a complementary guide edge against each suspension tab of said pad carriers abut,
   whereby said pad carriers are slidably supported in said caliper for movement parallel to the rotational axis of said brake disc.

2. The disc brake of claim 1 wherein an edge section of each pad carrier adjacent said pin opening abuts a complementary support surface on said caliper.

3. A spot-type disc brake comprising a brake support member disposed on one side of and parallel to a brake disc
   a brake caliper embracing the edge of said brake disc, said caliper having an arm having a first opening through which a bushing passes to slidably mount said caliper to said support, said caliper having a second opening on a disc exit side thereof with respect to a main direction of rotation of said disc, a pin received in the second opening in the caliper and extending parallel to a rotational axis of said brake disc,
   a pair of brake shoes each disposed on a different side of said brake disc and each including a pad carrier and a friction pad fastened to the carrier, each of said pad carriers having an opening at said disc exit side thereof through which said pin passes, each of said pad carriers also having a suspension tab extending from a disc exit side thereof, said caliper having a complementary guide edge against each suspension tab of said pad carriers, abut,
   whereby said pad carriers are slidably supported in said caliper for movement parallel to the rotational axis of said brake disc.

* * * * *